(12) United States Patent
Smith

(10) Patent No.: US 12,485,385 B1
(45) Date of Patent: Dec. 2, 2025

(54) SYSTEMS AND METHODS FOR MANAGING HYDROCARBON EMISSIONS

(71) Applicant: Stevie Horton Smith, Galveston, TX (US)

(72) Inventor: Stevie Horton Smith, Galveston, TX (US)

( * ) Notice: Subject to any disclaimer, the term of this patent is extended or adjusted under 35 U.S.C. 154(b) by 0 days.

(21) Appl. No.: 18/973,474

(22) Filed: Dec. 9, 2024

Related U.S. Application Data

(60) Provisional application No. 63/655,894, filed on Jun. 4, 2024.

(51) Int. Cl.
*B01D 53/86* (2006.01)

(52) U.S. Cl.
CPC ....... *B01D 53/864* (2013.01); *B01D 53/8696* (2013.01)

(58) Field of Classification Search
CPC .......................... B01D 53/864; B01D 53/8696
(Continued)

(56) References Cited

U.S. PATENT DOCUMENTS 3,757,521 A * 9/1973 Tourtellotte ........... B01D 53/86
60/284
5,421,154 A * 6/1995 Pfefferle ............... F01N 13/002
60/299

(Continued)

FOREIGN PATENT DOCUMENTS

GB 2280711 A * 2/1995 .......... F01N 13/009

OTHER PUBLICATIONS

MTI Analytical Technology: TRACErase Operating and Instruction Manual, Analyzer Catalytic Fugitive Emissions Eliminator (16 p.).

*Primary Examiner* — Anita Nassiri-Motlagh
(74) *Attorney, Agent, or Firm* — CONLEY ROSE, P.C.

(57) ABSTRACT

A system for reducing the release of hydrocarbons intermittently or continuously emitted from a hydrocarbon source into the atmosphere includes a hydrocarbon supply conduit configured to receive the emitted hydrocarbons from the hydrocarbon source. In addition, the system includes an air supply conduit configured to receive air from an air source. Further, the system includes an aspirator fluidly coupled to the air supply conduit and the hydrocarbon supply conduit. The aspirator is configured to (i) receive air from the air supply conduit, (ii) receive the emitted hydrocarbons from the hydrocarbon supply conduit, and (iii) mix the air with the emitted hydrocarbons to form an air-hydrocarbon mixed stream. Still further, the system includes a mixing tee fluidly coupled to the air supply conduit, the hydrogen supply conduit, and the aspirator. The mixing tee is configured to (i) receive the air-hydrocarbon mixed stream from the aspirator, (ii) receive supplemental air from the air supply conduit, and (iii) mix the supplemental air and the air-hydrocarbon mixed stream to form an air-entrained hydrocarbon stream. The system also includes an air-entrained hydrocarbon conduit fluidly coupled to the mixing tee. Moreover, the system includes a catalytic converter fluidly coupled to the air-entrained hydrocarbon conduit and configured to receive the air-entrained hydrocarbon stream, and wherein the catalytic converter includes a catalyst configured to catalytically combust and oxidize the emitted hydrocarbons in the air-entrained hydrocarbon stream.

14 Claims, 3 Drawing Sheets

(58) Field of Classification Search
USPC .................................................. 423/245.3
See application file for complete search history.

(56) References Cited

U.S. PATENT DOCUMENTS

| | | |
|---|---|---|
| 5,855,781 A | 1/1999 | Yorita et al. |
| 2016/0010532 A1* | 1/2016 | Spaulding .............. F01N 3/101 60/276 |

* cited by examiner

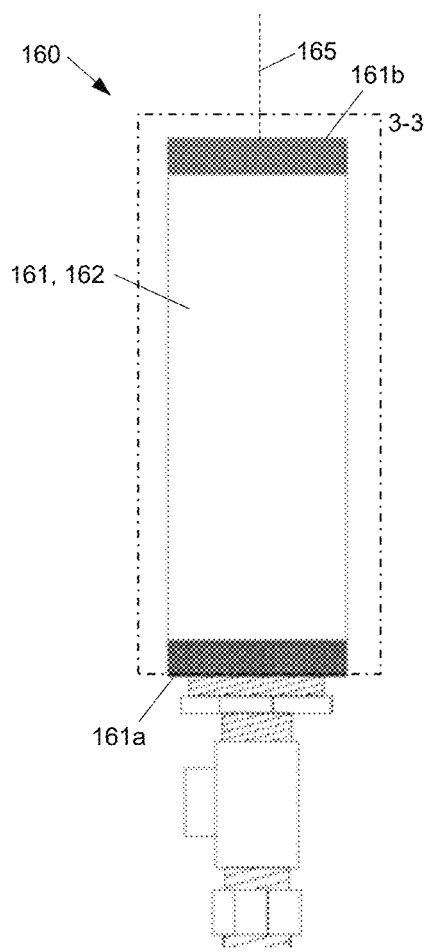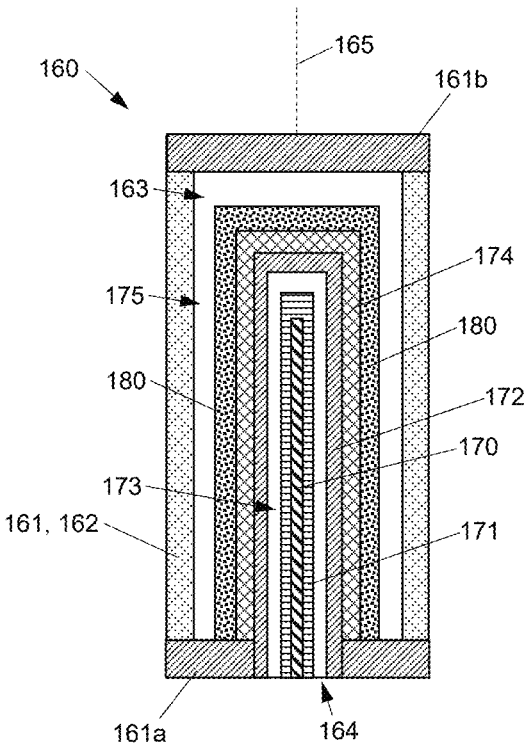
FIG. 2　　　　　　　　FIG. 3

SYSTEMS AND METHODS FOR MANAGING HYDROCARBON EMISSIONS

CROSS-REFERENCE TO RELATED APPLICATIONS

This application claims priority to U.S. Provisional Application Ser. No. 63/655,894 filed on Jun. 4, 2024 and entitled "Systems and Methods for Managing Hydrocarbon Emissions," which is hereby incorporated herein by reference in its entirety for all purposes.

STATEMENT REGARDING FEDERALLY SPONSORED RESEARCH OR DEVELOPMENT

Not applicable.

TECHNICAL FIELD

This disclosure relates generally to systems and methods for reducing and/or preventing the release of hydrocarbon emissions such as methane into the atmosphere. More particularly, this disclosure relates to systems and methods for catalytically combusting and oxidizing hydrocarbon emissions to reduce and/or eliminate fugitive emissions.

BACKGROUND

Hydrocarbon production systems (both actively producing and abandoned), hydrocarbon fluid analyzers, petrochemical plants, refineries, and other industrial activities may intermittently or continuously emit hydrocarbons to the surrounding environment, which may present environmental concerns and/or hazards. For example, wellheads and other equipment utilized for producing hydrocarbons from subsurface wells traversing subterranean earthen formations present a potential leak source of hydrocarbons into the environment.

In many jurisdictions, environmental regulations may limit and/or prevent the emission of hydrocarbons into the environment, even in relatively small, trace quantities. For instance, some jurisdictions may require active monitoring of potential leak points to ensure that any hydrocarbons emitted to the surrounding environment are identified and mitigated.

BRIEF SUMMARY OF THE DISCLOSURE

Embodiments of systems for reducing the release of hydrocarbons intermittently or continuously emitted from a hydrocarbon source into the atmosphere are disclosed herein. In an embodiment, a system for reducing the release of hydrocarbons intermittently or continuously emitted from a hydrocarbon source into the atmosphere comprises a hydrocarbon supply conduit configured to receive the emitted hydrocarbons from the hydrocarbon source. In addition, the system comprises an air supply conduit configured to receive air from an air source. Further, the system comprises an aspirator fluidly coupled to the air supply conduit and the hydrocarbon supply conduit. The aspirator is configured to (i) receive air from the air supply conduit, (ii) receive the emitted hydrocarbons from the hydrocarbon supply conduit, and (iii) mix the air with the emitted hydrocarbons to form an air-hydrocarbon mixed stream. Still further, the system comprises a mixing tee fluidly coupled to the air supply conduit, the hydrogen supply conduit, and the aspirator. The mixing tee is configured to (i) receive the air-hydrocarbon mixed stream from the aspirator, (ii) receive supplemental air from the air supply conduit, and (iii) mix the supplemental air and the air-hydrocarbon mixed stream to form an air-entrained hydrocarbon stream. The system also comprises an air-entrained hydrocarbon conduit fluidly coupled to the mixing tee. Moreover, the system comprises a catalytic converter fluidly coupled to the air-entrained hydrocarbon conduit and configured to receive the air-entrained hydrocarbon stream, and wherein the catalytic converter includes a catalyst configured to catalytically combust and oxidize the emitted hydrocarbons in the air-entrained hydrocarbon stream.

Embodiments of methods for reducing the release of hydrocarbons emitted from a hydrocarbon source into the atmosphere are disclosed herein. In an embodiment, a method for reducing the release of hydrocarbons emitted from a hydrocarbon source into the atmosphere comprises (a) receiving the emitted hydrocarbons. In addition, the method comprises (b) adding air to the emitted hydrocarbons to form an air-hydrocarbon mixed stream. Further, the method comprises (c) adding supplemental air to the air-hydrocarbon mixed stream to form an air-entrained hydrocarbon stream. Still further, the method comprises (d) flowing the air-entrained hydrocarbon stream to a catalytic converter. Moreover, the method comprises (e) catalytically combusting and oxidizing the hydrocarbons in the air-entrained hydrocarbon stream within the catalytic converter.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of the disclosed embodiments, reference will now be made to the accompanying drawings in which:

FIG. 2 is a side view of one of the catalytic converters of FIG. 1;

FIG. 3 is a schematic cross-sectional view of the catalytic converter of FIG. 2 taken in section 3-3 of FIG. 2.

DETAILED DESCRIPTION OF THE DISCLOSED EMBODIMENTS

Figure 1:
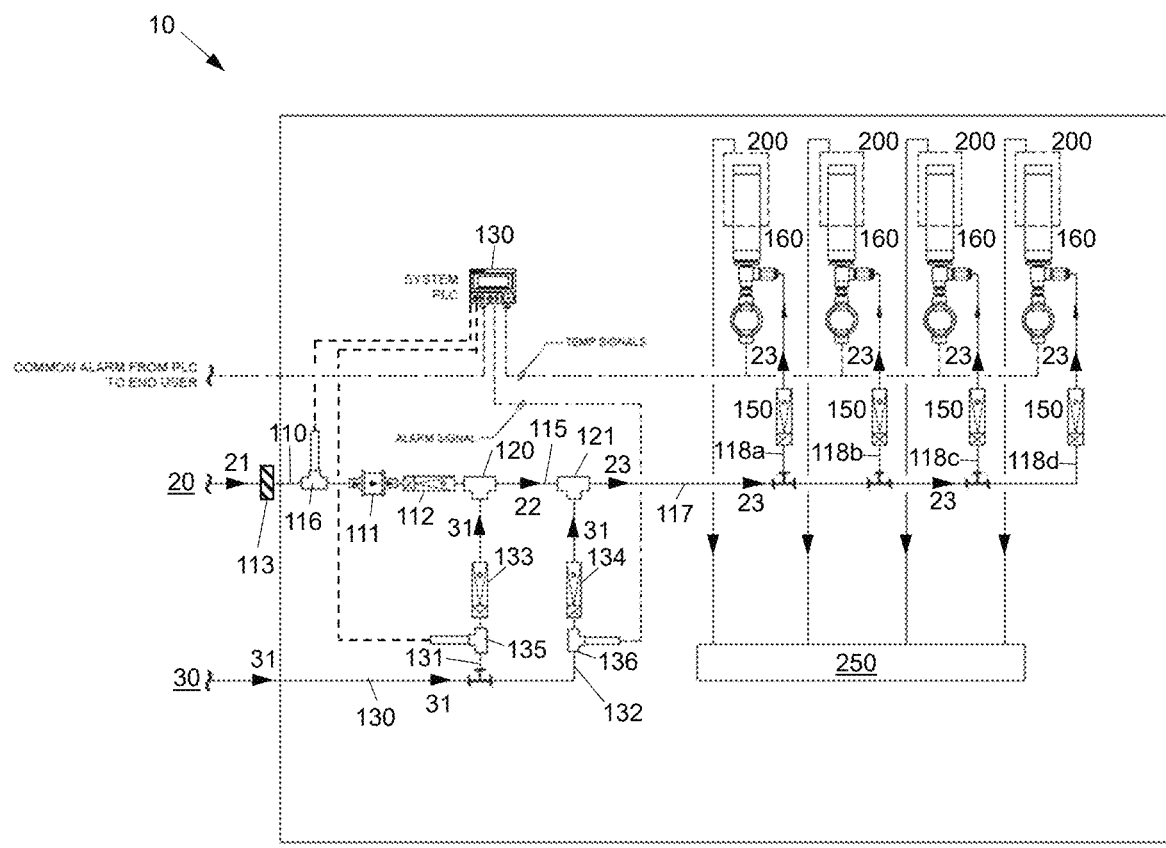
FIG. 1 is a schematic view of an embodiment of a hydrocarbon emission management system in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates to the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As previously described, a variety of industrial activities may produce intermittent or continuous hydrocarbon emissions that may require mitigation to reduce and/or eliminate the release of such hydrocarbon emissions to the atmosphere. Some environmental regulations may limit and/or prevent the emission of hydrocarbons into the environment, even in trace quantities. For example, some environmental regulatory bodies such as the Environmental Protection Agency (EPA) require a vent control system when the release of fugitive hydrocarbon emissions is possible. In general, the purpose of the vent control system is to eliminate or significantly reduce the release of fugitive hydrocarbon emissions. While thermal oxidizers are available for vents that emit relatively large volumes of hydrocarbons (e.g., greater than 100 standard cubic feet per minute), vent control systems for relatively small volumes of hydrocarbons (e.g., less than 1.0 standard cubic foot per minute) are limited. For example, one conventional vent control system for eliminating undesirable hydrocarbon emissions employs a catalytic converter that is heated to a temperature sufficient to ignite and combust hydrocarbon emissions. However, such systems are limited to relatively small quantities of intermittent fugitive emissions. For instance, one such conventional vent control system is limited to a maximum hydrocarbon flow rate of 1.0 liter per minute (~0.035 standard cubic feet per minute) with a maximum BTU throughput of 750 BTU per hour. However, due to limited (if any) diagnostics to ensure the system is operating properly, a user may inadvertently exceed the maximum flow rate (1.0 liter per minute) and/or the BTU throughput (750 BTU per hour). Exceeding either of these operational parameters may result in damage to the system and/or the system not performing its intended purpose. Thus, although such conventional vent control systems can be used to combust fugitive hydrocarbon emissions, they are generally less suitable for dealing with continuous hydrocarbon emissions and/or larger quantities of hydrocarbon emissions due to limitations in volumetric and heat throughput. If additional capacity is desired, multiple systems may need to be installed, which potentially increases costs and the complexity of the infrastructure (e.g., plumbing) to route the emissions to multiple systems. Further, due to limited (if any) diagnostics to monitor the performance of the catalyst in such conventional systems, the catalyst is often replaced on a periodic basis regardless of the actual remaining useful operating life of the catalyst. To reduce the potential for undesirably releasing hydrocarbon emissions into the atmosphere, the catalyst may often be replaced at an overly frequent rate, which undesirably increases operating costs and the frequency at which the associated industrial activity that is producing the hydrocarbon emissions must be shut down to replace the catalyst.

Accordingly, embodiments of hydrocarbon emission mitigation systems and methods described herein are designed and configured to accommodate relatively large throughputs of hydrocarbon emissions, and further, include features for monitoring catalyst performance and enhancing combustion of the hydrocarbon emissions.

Referring now to FIG. 1, an embodiment of a hydrocarbon emissions mitigation system 10 is shown. The system 10 may be disposed proximate to a source 20 of intermittent and/or continuous hydrocarbon emissions 21, which may also be referred to as hydrocarbons. In general, system 10 can be used to mitigate the release of hydrocarbons from any potential source of intermittent and/or continuous hydrocarbon emissions (e.g., hydrocarbon emissions 21) including, without limitation, fluid conduits (e.g., pipelines), storage vessels, containers, hydrocarbon production equipment (e.g., wellheads), and the like. The specific composition of the hydrocarbon emissions 21 (e.g., wt % of methane, ethane, propane, butane, etc. in hydrocarbon emissions 21) can be determined, and thus, is generally known and may be consistent over time (i.e., the composition of the hydrocarbon emissions 21 can be the same over time). Further, in many applications, the volumetric flow rate of the hydrocarbon emissions 21 from source 20 can be determined, and thus, is generally known and may be constant over time. For example, in some applications, the volumetric flow rate of the hydrocarbon emissions 21 from source 20 is between about 1.0 liters per minute and about 4.0 liters per minute, and may remain constant over time.

In this embodiment, system 10 includes a plurality of flow control devices 150 and a plurality of catalytic converters 160 with each catalytical converter 160 fluidly coupled to one corresponding flow control device 150. While the embodiment shown in FIG. 1 illustrates four (4) flow control devices 150 and four (4) catalytic converters 160, in alternative embodiments, a different number of flow control devices (e.g., flow control devices 150) and catalytic converters (.e.g., catalytical converters 160), for example, one (1), two (2), three (3), five (5), six (6), seven (7), eight (8), nine (9), ten, or more, may be provided.

In some embodiments, one or more components of the system 10 may be configured as one or more units. For example, various components of the system 10 may be disposed on a common mounting plate. For example, the system 10 may comprise a mounting plate and associated hardware such that the system 10 may be moved, mounted, etc., as a unit.

In the embodiment of FIG. 1, hydrocarbon emissions 21 are provided by a suitable hydrocarbon gas supply conduit 110 from source 20 to a first or upstream fluid coupling 120. Thus, hydrocarbon gas supply conduit 110 is in fluid communication with first fluid coupling 120. In this embodiment, first fluid coupling 120 is an aspirator, and thus, coupling 120 may also be referred to herein as aspirator 120. A flame arrestor 111, and a flow control device 112 are disposed along conduit 110 between source 20 and aspirator 120. Flame arrestor 111 allows the hydrocarbon emission 21 to pass therethrough along conduit 110 but extinguishes any flames seeking to pass through conduit 110 to reduce the potential for fires and explosions in connection with system 10. In general, flame arrestor 111 can be any suitable device known in the art for preventing flames from passing therethrough including, without limitation, a deflagration arrestor, a flame trap, or the like. Flow control device 112 measures and controls the volumetric flow rate of the hydrocarbon emissions 21 passing through conduit 110. Accordingly, flow control device 112 may also be referred to as hydrocarbon flow control device 112. Thus, flow control device 112 is configured to both (i) measure the volumetric flow rate of the hydrocarbon emissions 21 flowing therethrough, and (ii) can be adjusted (e.g., via a manually adjusted valve) to vary and control the volumetric flow rate of the hydrocarbon emissions 21 flowing therethrough. In general, flow control device 112 can be any suitable device (s) known in the art for measuring and controlling the flow rate of a fluid (e.g., hydrocarbon emissions 21).

It is preferred that the incoming hydrocarbon emissions 21 passing through conduit 110 be maintained at a constant or substantially constant pressure, for example, so as to not create a measurement bias for any analytical instrumentation upstream of system 10 (e.g., a control panel) 160. Accordingly, in this embodiment, a pressure regulator 113 is provided along conduit 110 to ensure the pressure of the hydrocarbon emissions 21 flowing through conduit 110 are maintained at or near a constant pressure. In this embodiment, pressure regulator 113 is a subatmospheric vacuum pressure regulator that maintains the pressure of the hydrocarbon emissions 21 at or near atmospheric pressure. As shown in FIG. 1, pressure regulator 113 is disposed along conduit 110 upstream of flame arrestor 111 and flow control device 112. However, in other embodiments, the pressure regulator (e.g., pressure regulator 113) may be disposed at other suitable locations of system 10 or may be incorporated into another components, such as aspirator 120.

Referring still to FIG. 1, an air source 30 provides air 31 to system 10 via a suitable air supply conduit 130. Air supply conduit 130 is fluidly coupled to hydrocarbon gas supply conduit 110 and is configured to add air 31 to the hydrocarbon emissions 21 flowing through hydrocarbon gas supply conduit 110. In this embodiment, a first branch conduit 131 extends from air supply conduit 130 to aspirator 120 and a second branch conduit 132 extends from air supply conduit 130 to a second or downstream fluid coupling 121. In this embodiment, second fluid coupling 121 is a mixing tee, and thus, fluid coupling 121 may also be referred to as mixing tee 121. Thus, air supply conduit 130 is fluidly coupled to aspirator 120 and mixing tee 121. First branch conduit 131 extends from air supply conduit 130 upstream of second branch conduit 132, and thus, first branch conduit 131 may also be referred to as upstream branch conduit 131 and second branch conduit 132 may also be referred to as downstream branch conduit 132. A flow control device 133 is disposed along upstream branch conduit 131 between air supply conduit 130 and aspirator 120, and a flow control device 134 is disposed along downstream branch conduit 132 between air supply conduit 130 and mixing tee 121. Flow control device 133 measures and controls the volumetric flow rate of the air 31 supplied to first fluid coupling 120, and flow control device 134 measures and controls the volumetric flow rate of the air 31 supplied to second fluid coupling 121. Accordingly, flow control device 133 may also be referred to as aspirator air supply flow control device 133 and flow control device 134 may also be referred to as mixing tee air supply flow control device 134. Thus, each flow control device 133, 134 is configured to both (i) measure the volumetric flow rate of the air 31 flowing therethrough, and (ii) can be adjusted (e.g., via a manually adjusted valve) to vary and control the volumetric flow rate of air flowing therethrough. In general, flow control devices 133, 134 can be any suitable device(s) known in the art for measuring and controlling the flow rate of a fluid (e.g., air 31).

Aspirator 120 is configured such that the flow of the hydrocarbon emissions 21 therethrough draws air 31 into aspirator 120, thereby allowing the air 31 to be incorporated into and mixed with the hydrocarbon emissions 21 to form an air-hydrocarbon mixed stream 22. In this embodiment, the volumetric flow rate of the hydrocarbon emissions 21 into aspirator 120 is generally constant over time, and aspirator 120 is set such that the corresponding volumetric flow rate of the air 31 drawn into aspirator 120 via the flow of the hydrocarbon emissions 21 through aspirator 120 is generally constant over time. The air-hydrocarbon mixed stream 22 is provided by a suitable air-hydrocarbon mixed stream supply conduit 115 to mixing tee 121. Additional or supplemental air 31 is provided, via downstream branch conduit 132, to mixing tee 121 and the air-hydrocarbon mixed stream 22 passing therethrough. Mixing tee 121 is configured to additional or supplemental air 31 into the air-hydrocarbon mixed stream 22 to form an air-entrained hydrocarbon stream 23. Flow control device 134 along downstream branch conduit 132 is configured to be adjusted to control the volumetric flow rate of supplemental air 31 supplied to mixing tee 121 based on the relative amounts of the hydrocarbon emissions 21 and air 31 in the air-hydrocarbon mixed stream 22 (as measured by flow control devices 112, 133) to ensure the resulting air-entrained hydrocarbon stream 23 has a suitable fuel-to-air ratio for complete or substantially complete catalytic combustion and oxidation of the hydrocarbon emissions 21 in catalytic converters 160 described in more detail below. In some embodiments, flow control device 134 is operated such that the volumetric flow rate of supplemental air 31 through conduit 132 into mixing tee 121 is about 10 to 15 times the volumetric flow rate of the hydrocarbon emissions 21 from source 20 through flow control device 112

Referring still to FIG. 1, in this embodiment, system 10 also comprise a plurality of flow sensors 116, 135, 136 disposed along conduits 110, 131, 132, respectively. Flow sensor 116 monitors the flow of the hydrocarbons 21 to aspirator 120, flow sensor 135 monitors the flow of the air 31 to aspirator 120, and flow sensor 135 monitors the flow of additional or supplemental air 31 to mixing tee 121. In particular, flow sensor 116 is configured to provide a signal indicative of a low flow of the hydrocarbons 21 through conduit 110 and a high flow of the hydrocarbons 21 through conduit 110; flow sensor 135 is configured to provide a signal indicative of a low flow of the air 31 through conduit 131 and a high flow of the air 31 through conduit 131; and flow sensor 136 is configured to provide a signal indicative of a low flow of the air 31 through conduit 132 and a high flow of the air 31 through conduit 132. For example, in the embodiment of FIG. 1, system 10 may include a controller 130, such as a programmable logic controller (PLC), configured to provide a signal, such as an alarm, to an end user based upon one or more received signals from the one or more of the flow sensors 116, 135, 136. Not intending to be bound by theory, a proper flow of hydrocarbon emissions 21 (between upper and lower thresholds) and a proper flow of the air 31 (between upper and lower thresholds) into system 10 is particularly desirable to ensure the proper operation of catalytic converters 160. In this embodiment, each flow sensor 116, 135, 136 may be, for example, a flow switch such as a thermal flow sensor.

It is to be understood that the air 31 supplied to system 10 from source 30 includes oxygen (about 21 vol %), nitrogen (about 78 vol %), and small amounts of a variety of other gases (e.g., argon, carbon dioxide, water vapor, etc.). As will be described in more detail below, the hydrocarbons 21 and oxygen from the air 31 in the air-entrained hydrocarbon stream 23 are mixed prior to being supplied to flow control devices 150, and are then catalytically combusted within the corresponding catalytic converters 160 to oxidize the hydrocarbons 21. However, the remaining constituents of the air 31 (e.g., nitrogen, argon, carbon dioxide, water vapor, etc.) generally pass through catalytic converters 160 substantially unchanged. Accordingly, for purposes of clarity and further explanation, the constituents of air other than oxygen will generally be disregarded with the understanding such constituents flow (along with the catalytic combustion and oxidation products) through catalytic converters 160 and any other components of system 10 downstream of catalytic converters 160. It should also be appreciated that since the oxygen in the air 31 is relied on to oxidize hydrocarbon emissions 21 in catalytic converters 160, whereas the remaining constituents of the air 31 generally pass through catalytic converters 160 substantially unchanged, oxygen-containing streams other than air 31 (e.g., 50%, 60%, 70%, 80%, 90%, 95%, or substantially pure oxygen) may likewise be added to the hydrocarbon emissions 21 prior to introduction to flow control devices 150 and catalytic converters 160.

Referring still to FIG. 1, a portion of the air-entrained hydrocarbon stream 23 is provided to each flow control device 150 from mixing tee 121 via an air-entrained hydrocarbon stream supply conduit 117 extending from mixing tee 121 and a corresponding branch conduit 118a, 118b, 118c, 118d extending from supply conduit 117 to a corresponding flow control device 150. In addition, the portion of the air-entrained hydrocarbon stream 23 supplied to each flow control device 150 is supplied to a corresponding catalytic converter 160 by a corresponding transfer conduit. Thus, catalytic converters 160 are fluidly coupled to flow control devices 150, mixing tee 121, aspirator 120, air supply conduit 130, and hydrocarbon gas supply conduit 110.

Flow control devices 150 are configured to measure and control the volumetric flow rate of the air-entrained hydrocarbon stream 23 into the corresponding catalytic converters 160. Thus, each flow control device 150 is configured to both (i) measure the volumetric flow rate of the air-entrained hydrocarbon stream 23 flowing therethrough to the corresponding catalytic converter 160, and (ii) can be adjusted (e.g., via a manually adjusted valve) to vary and control the volumetric flow rate of the air-entrained hydrocarbon stream 23 flowing therethrough to the corresponding catalytic converter 160. In general, each flow control device 150 can be any suitable device(s) known in the art for measuring and controlling the flow rate of a fluid (e.g., the air-entrained hydrocarbon stream 23). While the hydrocarbons 21 and air 31 in the air-entrained hydrocarbon stream 23 are supplied to catalytic converters 160, the volumetric flow rate of the air-entrained hydrocarbon streams 23 are measured and can be adjusted by flow control devices 150 to achieve a desired volumetric flow rate of the air-entrained hydrocarbon stream 23 into each catalytic converter 160. In particular, the volumetric flow rate of the air-entrained hydrocarbon stream 23 to each catalytic converter 160 may be limited to an upper or maximum volumetric flow rate that still enables complete or substantially complete catalytic combustion and oxidation of the hydrocarbon emissions 21 by/within each catalytic converter 160. In other words, each catalytic converter 160 may have or be rated to have an upper or maximum volumetric throughput that still allows for complete or substantially complete catalytic combustion and oxidation of the hydrocarbon emissions 21 without risk of damage to catalytic converters 160, and exceeding such maximum throughput may result in the undesirable, incomplete catalytic combustion and oxidation of the hydrocarbon emissions 21 by/within each catalytic converter 160 and/or damage to one or more catalytic converters 160. Referring now to FIGS. 2 and 3, one catalytic converter 160 is shown and will be described it being understood that each catalytic converter 160 is the same. In this embodiment, catalytic converter 160 includes an outer housing 161, a heater 170 disposed within housing 161, and a catalyst 180 disposed within housing 161. Housing 161 has a central or longitudinal axis 165, a first or lower end 161a, a second or upper end 161b, a radially outer wall 162 extending axially from lower end 161a to upper end 161b, and an inner cavity 163 disposed within outer wall 162 between ends 161a, 161b. Heater 170 extends into cavity 163 from lower end 161a and catalyst 180 is disposed about heater 170 within cavity 163. Upper end 161b of housing 161 is closed and capped, and an inlet 164 for receiving heater 170 and the air-entrained hydrocarbon stream 23 into inner cavity 163 is provided at lower end 161a of housing 161. Outer wall 162 of housing 161 extends between ends 161a, 161b. Housing 161 is made of a rigid, durable material capable of withstanding exposure to hydrocarbons and the catalytic processes within inner cavity 163. For example, housing 161 may be made of a 316 stainless steel tubular pipe with 316 stainless steel end caps fixably attached to the ends of the pipe. In this embodiment, outer wall 162 is made of sintered metal that is porous, thereby allowing catalytic combustion products, any excess oxygen, and any remaining constituents of the air 31 (e.g., nitrogen, argon, carbon dioxide, water vapor, etc.) to pass therethrough from inner cavity 163 to the environment surrounding housing 161. Although catalytic converter 160 is shown in FIGS. 2 and 3 in a vertical orientation, in general, catalytic converter 160 can be oriented in any other orientations.

As best shown in FIG. 3, in this embodiment, heater 170 is slidably disposed in a thermowell 171. In general, heater 170 can be any suitable device known in the art for heating the air-entrained hydrocarbon stream 23 that enter inner cavity 163 to a temperature sufficient for oxidation of hydrocarbons in the presence of catalyst 180. One example of a suitable device that can be used for heater 170 is the Hotwatt Cartridge Type heater available from Backer Hotwatt of Danvers, Massachusetts.

A probe 172 is positioned about heater 170 and thermowell 171 but is radially spaced therefrom, thereby defining an annulus 173 radially positioned between thermowell 171 and probe 172. Annulus 173 is in fluid communication with inlet 164 and receives the air-entrained hydrocarbon stream 23 via inlet 164. In addition, a mesh screen 174 is disposed about probe 172 within cavity 163, and catalyst 180 is disposed about mesh screen 174 within cavity 163. In this embodiment, mesh screen 174 slidingly engages probe 172 and catalyst 180 slidingly engages mesh screen 174. An annulus 175 is radially positioned between catalyst 180 and outer wall 162 of housing 161. Probe 172, mesh screen 174, and catalyst 180 have holes, perforations, slots, pores, or combinations thereof to allow fluids to pass radially outwardly therethrough from annulus 173 to annulus 175. In some embodiments, a temperature sensor may extend into cavity 163 to monitor the temperature therein. Probe 172 and/or mesh screen 174 may function as a diffuser to substantially uniformly distribute the flow of the fluids (e.g., the air-entrained hydrocarbon stream 23) therethrough. In other embodiments, a separate diffuser may be provided. In general, the size (e.g., diameters) of the holes, perforations, slots, pores, or combinations can be selected based upon a variety of factors such as the composition of the hydrocarbon emissions 31 (e.g., the presence and relative proportion of methane, ethane, propane, butane, etc.) and the flow rate of the air-entrained hydrocarbon stream 23 from the corresponding flow control device 150 to catalytic converter 160.

As will be described in more detail, catalyst 180 oxidizes hydrocarbon emissions 21 in the air-entrained hydrocarbon stream 23 at a temperature less than the combustion temperature of the hydrocarbon emissions 21. In general, catalyst 180 can comprise any suitable catalyst or combination of catalysts for oxidizing hydrocarbons including, for example, without limitation, Pd-based catalysts, platinum-based catalysts, and rhodium-based catalysts.

During operations to catalytically combust hydrocarbon emissions 21 to reduce and/or eliminate fugitive emissions, the air-entrained hydrocarbon stream 23 flows from the corresponding flow control device 150 and inlet 164 into catalytic converter 160. More specifically, the air-entrained hydrocarbon stream 23 flows through inlet 164 into annulus 173 where it is heated by heater 170 to a temperature sufficient for catalytic combustion inlet 164 upon subsequent contact with catalyst 180. Next, the heated air-entrained hydrocarbon stream 23 flows radially outward from annulus 73 through probe 172 and mesh 174 into catalyst 180. Contact between the heated air-entrained hydrocarbon stream 23 and catalyst 180 (at the sufficiently elevated temperature) catalytically combusts and oxidizes the hydrocarbons in the heated air-entrained hydrocarbon stream 23 to produce carbon dioxide, nitrogen ($N_2$), and water. Such catalytic combustion and oxidation products, along with any un-catalytically combusted hydrocarbons and/or oxygen (if any) generally mix with the remaining constituents of the air 31 (e.g., nitrogen, argon, carbon dioxide, water vapor, etc.) pass radially outward from catalyst 180 into annulus 175, and then pass radially outward from annulus 175 through outer wall 162 into the environment immediately surrounding catalytic converter 160.

In some embodiments, one or more oxygen sensors may be provided along or proximate to inlet 164 and/or the radially outer surface of outer wall 162 of housing 161 of catalytic converter 160. The one or more oxygen sensors may aid in assessing whether the proper amount or concentration of oxygen is provided in the air-entrained hydrocarbon stream 23 flowing into catalytic converter 160 and the amount or concentration of oxygen (if any) in the fluids exiting catalytic converter 160 through outer wall 162. In general, each oxygen sensor can be any suitable type of oxygen sensor known in the art for measuring the presence, amount, or concentration of oxygen in a flowing fluid including, without limitation, a thermal flow sensor, or the like. In some embodiments, for example, as illustrated in FIG. 1, one or more catalytic converters 160 (e.g., a temperature sensor in each catalytic converter 160) may be in signal communication with the controller 130. For example, the controller 130 may be configured to receive temperature data associated with each of the respective catalytic converters 160 and to output an alarm to the end-user if the temperature of one of the catalytic converters 160 is not within a predefined range or above a predetermined threshold.

Referring again to FIG. 1, a gas capture device 200 is provided for each catalytic converter 160. Each gas capture device 200 is generally configured to capture gas emissions exiting catalytic converter 160, and more specifically, to receive and capture any unreacted, un-catalytically combusted hydrocarbons such as methane, ethane, propane, butane, etc. in the fluids exiting the corresponding catalytic convert 160.

Figure 4:
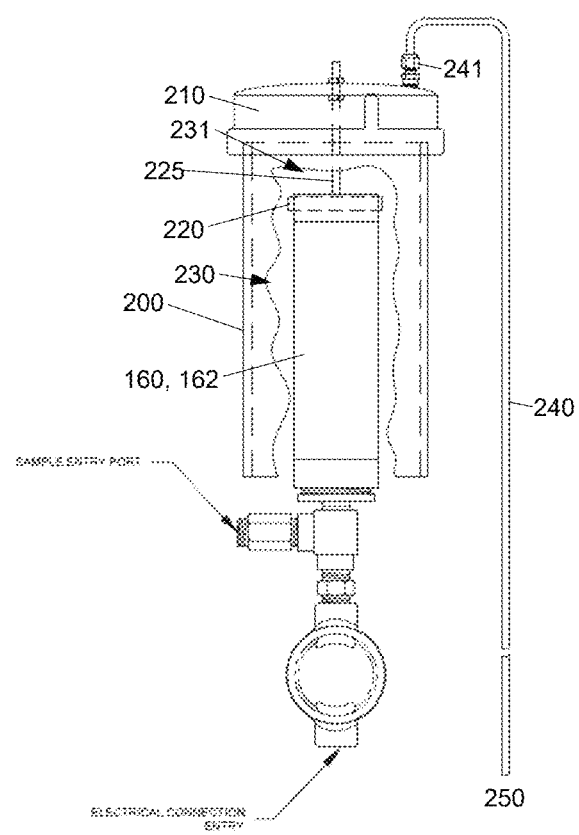
FIG. 4 is a schematic view of one of the gas capture devices and corresponding catalytic converter of FIG. 1.

Referring now to FIG. 4, one gas capture device 200 will be shown and described, it being understood each gas capture device 200 is the same. In this embodiment, gas capture device 200 includes a cap 210 disposed over and about catalytic converter 160 and fixably coupled to catalytic converter 160. Cap 210 is sized and shaped to receive and capture any unreacted, un-catalytically combusted hydrocarbons such as methane, ethane, propane, butane, etc. in the fluids exiting catalytic convert 160. In this embodiment, cap 210 is an inverted cup with an inner chamber and a closed upper end. Catalytic converter 160 is disposed within the inner chamber of cap 210 such that fluids exiting catalytical converter through outer wall 162 into the inner chamber of cap 210. Gas capture device 200 is coupled to catalytic converter 160 with a mounting clamp 220 and a support 225. Mounting clamp 220 is disposed about and secured to outer housing 161 of catalytic converter 160 proximal upper end 161b. Support 225 is fixably coupled to clamp 220 and extends vertically upward therefrom from catalytic converter 160 through the inner chamber of cap 210 to the upper end of cap 210. In this embodiment, support 225 is a threaded rod on which cap 210 is mounted. Cap 210 is spaced from catalytic converter 160 such that there is an annulus 230 radially positioned between catalytic converter 160 and cap 210, and an upper space 231 in fluid communication with annulus 230 and axially positioned between cap 210 and upper end 161b of housing 161.

Gases emitted from the catalytic converter 160, more particularly, unreacted, un-catalytically combusted hydrocarbons (e.g., methane, ethane, propane, and/or butane), which are lighter than air in the environment around gas capture device 200 and catalytic converter 160, pass through outer wall 162 of housing 161 into annulus 230 and rise through annulus 230 into upper space 231 within gas capture device 200. A sample line 240 is coupled to the upper end of cap 210 via a suitable tubing fitting 241 and is in fluid communication with upper space 231. Sample line 230 is routed to a suitable and convenient location, for sampling and testing the gases in upper space 231, such as using a volatile organic compound (VOC) analyzer 250.

A method for reducing and/or preventing the release of the hydrocarbon emissions 21 into the atmosphere in accordance with principles described herein will now be described. In the description that follows, the method is implemented with system 10 previously described and shown in FIG. 1.

The method includes receiving the intermittently and/or continuously emitted hydrocarbons 21 from source 20. The hydrocarbon emissions 21 are directed to aspirator 120 where air 31 is added to the hydrocarbons 21 to form the air-hydrocarbon mixed stream 22. The air-hydrocarbon mixed stream 22 is then directed to mixing tee 121. At mixing tee 121, additional or supplemental air 31 is added and mixed into the air-hydrocarbon mixed stream 22 to yield the air-entrained hydrocarbon stream 23.

The fuel-to-air ratio of the air-entrained hydrocarbon stream 23 is controlled and set to a pre-determined value sufficient to achieve complete (or substantially complete) catalytic combustion and oxidation of the hydrocarbons 21. In general, the appropriate (and desired) fuel-to-air ratio in the air-entrained hydrocarbon stream 23 to achieve complete catalytic combustion and oxidation of hydrocarbons 21 can be determined using techniques known in the art according to the composition of the emitted hydrocarbons 21, which is known, estimated, and/or predicted based on the source 20 of the hydrocarbon emissions 21. For example, if the hydrocarbon emissions are hydrogen ($H_2$) rich, then the desired fuel-to-air ratio may be about 1:10; if the hydrocarbon emissions are methane ($CH_4$) rich, then the desired fuel-to-air ratio may be about 1:12; if the hydrocarbon emissions are ethane ($C_2H_6$) rich, then the desired fuel-to-air ratio may be able 1:14; if the hydrocarbon emissions are propane ($C_3H_8$) rich, then the desired fuel-to-air ratio may be about 1:18; and if the hydrocarbon emissions includes 20 vol % or more of butane ($C_4H_{10}$) mixed with hydrogen ($H_2$), methane, ethane, and propane, then the desired fuel-to-air ratio may be about 1:20. Once the composition of the emitted hydrocarbons 21 is determined, the desired fuel-to-air ratio can be determined, and then flow control devices 112, 133, 134 can be used to adjust the relative amounts of the hydrocarbon emissions 21 and air 31 in the air-entrained hydrocarbon stream 23 to achieve the desired fuel-to-air ratio. The air-entrained hydrocarbon stream 23 is directed and flowed to flow control devices 150, and then to catalytic converters 160. While the hydrocarbons 21 and air 31 in the air-entrained hydrocarbon stream 23 are supplied to catalytic converts 160, the volumetric flow rate of the air-entrained hydrocarbon stream 23 provided to each catalytic converter 160 is measured by the corresponding flow control device 150, and may be adjusted by the corresponding flow control devices 150 to achieve a desired flow rate into the catalytic converter 160 that is expected to achieve complete or substantially complete catalytic combustion and oxidation of hydrocarbons 21 by the catalytic converter 160 without risk of damage to the catalytic converter 160.

The hydrocarbons 21 in the air-entrained hydrocarbon stream 23 are catalytically combusted and oxidized in catalytic converters 160. As previously described, the fuel-to-air ratio in the air-entrained hydrocarbon stream 23 is adjusted to achieve complete or substantially complete catalytic combustion and oxidation of the hydrocarbons 21.

During catalytic combustion and oxidation of the hydrocarbons 21, the temperature in catalytic converters 160 can be monitored via temperature sensors, and the temperature within inner chamber 163 of each catalytic converter 160 can be adjusted using the corresponding heater 170 to achieve a desired temperature to optimize catalytic combustion and oxidation the hydrocarbons 21. In general, the desired temperature within inner chamber 163 of each catalytic converter 160 can be determined using techniques known in the art according to the composition of the emitted hydrocarbons 21 and the type of catalyst 180. As previously described, the composition of the emitted hydrocarbons 21 may be known, estimated, and/or predicted based on the source 20 of the hydrocarbon emissions 21.

The catalytic combustion products (e.g., water vapor, nitrogen, and carbon dioxide), any remaining hydrocarbons, any remaining oxygen, and the remaining constituents of the air 31 (e.g., nitrogen, argon, carbon dioxide, water vapor, etc.) exit the catalytic converters 160. Gas capture devices 200 capture at least a portion of such fluids exiting catalytic converters 160, which can then be evaluated, such as via sample lines 240 and analyzers 250 to determine whether each catalytic converter 160 is operating as intended. For example, the ability of catalysts 180 in catalytic converters 160 160 to facilitate catalytic combustion and oxidation of hydrocarbons 21 generally decreases over time, and thus, as a given catalyst 180 approaches the end of its useful life, the presence of VOCs in the sample collected by the corresponding gas capture device 200 may indicate that the catalyst 180 is not operating as intended.

In the manner described, embodiments of systems and methods disclosed herein can be used to reduce and/or eliminate the release of hydrocarbon emissions into the atmosphere. In addition, embodiments of individual systems described herein are "scalable" to accommodate intermittent and continuous flows of hydrocarbon emissions, as well as varying volumetric flow rates of hydrocarbon emissions, thereby reducing and/or eliminating the complexities and costs associated with the use of multiple independent devices to manage hydrocarbon emissions. In particular, embodiments described herein employ multiple paths to ensuring that hydrocarbons are not emitted into the atmosphere. For example, it has been found via extensive testing and analysis that mixing oxygen with the hydrocarbons upstream of the catalytic converters (i.e., before introduction into catalytic converters 160) is particularly effective to decrease and/or prevent the emission of hydrocarbons from the catalytic converters, for example, to improve the efficiency of the catalytic converters in fully catalytically combusting and oxidizing the hydrocarbons. As the composition of hydrocarbon emissions from various sources may be different, the fuel-to-air ratio necessary for complete catalytic combustion and oxidation of the hydrocarbons may also vary. For example, hydrocarbon emissions containing 100% hydrogen may require 0.500 moles of oxygen for each mole of the hydrocarbon emissions. As another example, hydrocarbon emissions containing 100% methane may require 2 moles of oxygen for each mole of the hydrocarbon emissions. As yet another example, hydrocarbon emissions containing 100% propane may require 5 moles of oxygen for each mole of the hydrocarbon emissions. As further example, hydrocarbon emissions containing 50% methane, 25% ethane and 25% propane may require 3.125 moles of oxygen for each mole of the hydrocarbon emissions. Without the addition of the oxygen to the hydrocarbon emissions upstream of the catalytic converters, complete catalytic combustion and oxidation of the hydrocarbon emissions may not occur due to the lack of oxygen ingress into the catalyst zone. In addition, the gas capture devices, as disclosed herein, are effective to capture any hydrocarbons (e.g., VOCs) emitted from the catalytic converters such that the operation of the catalytic converters can be evaluated, and the systems and methods adjusted as appropriate to minimize and/or prevent the hydrocarbon emissions from being emitted into the atmosphere.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for reducing the release of hydrocarbons intermittently or continuously emitted from a hydrocarbon source into the atmosphere, the system comprising:
    a hydrocarbon supply conduit configured to receive the emitted hydrocarbons from the hydrocarbon source;
    an air supply conduit configured to receive air from an air source;
    an aspirator fluidly coupled to the air supply conduit and the hydrocarbon supply conduit, wherein the aspirator is configured to (i) receive air from the air supply conduit, (ii) receive the emitted hydrocarbons from the hydrocarbon supply conduit, and (iii) mix the air with the emitted hydrocarbons to form an air-hydrocarbon mixed stream;
    a mixing tee fluidly coupled to the air supply conduit, the hydrocarbon supply conduit, and the aspirator, wherein the mixing tee is configured to (i) receive the air-hydrocarbon mixed stream from the aspirator, (ii) receive supplemental air from the air supply conduit, and (iii) mix the supplemental air and the air-hydrocarbon mixed stream to form an air-entrained hydrocarbon stream;
    an air-entrained hydrocarbon conduit fluidly coupled to the mixing tee;
    a catalytic converter fluidly coupled to the air-entrained hydrocarbon conduit and configured to receive the air-entrained hydrocarbon stream, and wherein the catalytic converter includes a catalyst configured to catalytically combust and oxidize the emitted hydrocarbons in the air-entrained hydrocarbon stream; and
    a gas capture device fixably coupled to the catalytic converter and configured to capture gases emitted from the catalytic converter, wherein the gas capture device comprises an inverted cup having a cylindrical wall and an end-cap fixed to a first end of the cylindrical wall so as to define an inner chamber in which the catalytic converter is disposed.

2. The system of claim 1, further comprising a pressure regulator disposed along the hydrocarbon supply conduit and configured to regulate a pressure of the emitted hydrocarbons such that the emitted hydrocarbons are maintained at a substantially constant pressure.

3. The system of claim 2, wherein the aspirator and the mixing tee are positioned along the hydrocarbon supply conduit with the aspirator upstream of the mixing tee.

4. The system of claim 3, further comprising a mixing tee flow control device fluidly coupled to the air supply conduit and the mixing tee, wherein the mixing tee flow control device is configured to measure and control a volumetric flow rate of the supplemental air into the mixing tee.

5. The system of claim 4, wherein the mixing tee flow control device is configured to adjust the volumetric flow rate of the supplemental air into the mixing tee to achieve a pre-determined fuel-to-air ratio in the air-entrained hydrocarbon stream.

6. The system of claim 4, further comprising an aspirator flow control device fluidly coupled to the air supply conduit and the aspirator, wherein the aspirator flow control device is configured to measure and control a volumetric flow rate of air into the aspirator.

7. The system of claim 6, further comprising a hydrocarbon flow control device fluid coupled to the hydrocarbon supply conduit and the aspirator, wherein the hydrocarbon flow control device is configured to measure and control a volumetric flow rate of the emitted hydrocarbons through the hydrocarbon supply conduit.

8. The system of claim 1, further comprising a flame arrestor disposed along the hydrocarbon supply conduit.

9. The system of claim 1, wherein the gas capture device further comprises a sample line coupled to the inverted cup and configured to receive a sample of the gases emitted from the catalytic converter.

10. The system of claim 9, further comprising a volatile organic compound (VOC) analyzer in fluid communication with the sample line.

11. The system of claim 1, further comprising a plurality of catalytic converters coupled to the air-entrained hydrocarbon conduit, wherein each catalytic converter is to receive a portion of the air-entrained hydrocarbon stream, and wherein each catalytic converter includes a catalyst configured to catalytically combust and oxidize the emitted hydrocarbons in the corresponding portion of the air-entrained hydrocarbon stream.

12. The system of claim 11, further comprising a plurality of catalytic converter flow control devices, wherein each catalytic converter flow control device is fluidly coupled to one of the plurality of catalytic converters and is configured to measure and limit a maximum volumetric flow rate of the corresponding portion of the air-entrained hydrocarbon stream into the corresponding catalytic converter.

13. The system of claim 1, wherein gas capture device is fixably coupled to the catalytic converter via a clamp secured to the catalytic converter and a support disposed between the clamp and the end-cap.

14. The system of claim 1, wherein the inner chamber comprises an annulus between the cylindrical wall and the catalytic converter.

* * * * *